United States Patent Office 3,542,897
Patented Nov. 24, 1970

3,542,897
CATALYTIC DEHYDROGENATION OF PARAFFINS
Freddy Wattimena and Soei Keng Que, Amsterdam, Netherlands, assignors to Shell Oil Company, New York, N.Y., a corporation of Delaware
No Drawing. Filed Dec. 26, 1968, Ser. No. 787,230
Claims priority, application Great Britain, Aug. 2, 1968, 37,052/68
Int. Cl. C07c 5/18, 11/04; B01j 11/22
U.S. Cl. 260—683.3       10 Claims

ABSTRACT OF THE DISCLOSURE

Paraffins are dehydrogenated by contact at about 550° C., in the presence of steam and preferably also of hydrogen, with a catalyst containing copper oxide, chromium oxide, one or more rare earths and optionally manganese oxide.

BACKGROUND OF THE INVENTION

The present invention relates to the dehydrogenation of saturated hydrocarbons. More particularly, the invention relates to an improved process for the catalytic dehydrogenation of paraffinic hydrocarbons to corresponding monoolefins.

Chromia-alumina catalysts have long been used for the dehydrogenation of paraffins to olefins and/or diolefins. Quite frequently the system employed uses a catalyst containing from 10 to 20% $Cr_2O_3$ carried on a high area support such as activated alumina. Often small amounts of alkali metal oxides are added primarily to neutralize the acid sites on the catalyst and thereby minimize cracking reactions. Processes relying upon the use of this type of catalyst generally possess distinct disadvantages, such as for example:

(a) No steam can be used in their presence to aid in furnishing heat necessary for the endothermic dehydrogenation reaction, since steam strongly inhibits the activity of the chromia-alumina catalyst, (b) The dehydrogenation must generally be carried out under reduced pressure, to prevent major decreases in yield, and (c) Large amounts of carbon are usually deposited on the catalyst during the reaction, thereby diminishing catalyst activity, and necessitating regeneration of the catalyst with air and steam as often as about every ten minutes.

STATEMENT OF THE INVENTION

In accordance with the present invention saturated hydrocarbons are dehydrogenated to less saturated hydrocarbon with substantially improved efficiency with the aid of a catalyst composition consisting essentially of copper, chromium, a rare-earth metal and oxygen. If desired manganese and/or iron may additionally be present. Dehydrogenation of hydrocarbons in the presence of the novel catalyst compositions of this invention considerably minimizes many of the disadvantages generally inherent in catalytic dehydogenation processes used heretofore. The catalyst compositions of the present invention retain activity in the presence of an inert gas such as steam. They can be used at elevated pressures without loss in yield and require substantially less frequent regeneration.

DETAILED DESCRIPTION OF THE INVENTION

The catalyst compositions of the present invention, comprising as essential components thereof copper, chromium, a rare earth metal and, if desired, manganese and/or iron may be used as such or in combination with a suitable catalyst support. Components comprising copper and chromium generally constitute a major part of the catalyst composition and the rare earth metal-containing component a lesser amount. A part or all of the metal components of the catalyst compoistions may be preesnt therein in metallic form, as salts, hydroxides or oxides. The oxides are generally preferred. Each of the metals may be present in a different form; for example, a single catalyst composition may comprise metallic copper, an oxide of chromium and an oxide of a rare earth metal. In the interest of brevity and uniformity, the metal components will be assumed to be present in an oxide form in the following detailed description of the invention.

Within the scope of this invention the terms "oxides" or "oxide" of manganese is intended to denote manganese monooxide.

The term "rare earth," whenever used, denotes oxides of the metals having atomic numbers of from 57 to 71 inclusive, thorium and uranium.

The catalyst compositions may suitably comprise from about 20% to about 70% by weight copper oxide, from about 10% to about 60% by weight chromium oxide and from about 1% to about 15% by weight of one or more rare earths. Preferred catalyst compositions are those having a copper oxide concentration of from about 30% to about 60% by weight with a preferred chromium oxide concentration in the range of from about 35% to about 65% by weight. Particularly preferred catalyst compositions comprise those containing copper oxide and chromium oxide in substantially equal molar ratio.

The copper oxide and chromium oxide are present in combination with from about 1 to about 15% by weight of one or more rare earths.

Although catalysts containing one rare-earth metal (e.g., cerium) are very suitable, catalysts containing two or more rare-earth metals are preferred. The oxide form is preferred but the rare earth metals may also be present substantially as metals, as hydroxides, or as salts. A rare earth is considered to be present in the catalyst composition if its amount, calculated as oxide, exceeds 0.5% by weight of the total amount of rare earths (also calculated as oxides), present in that catalyst.

It has been found to be of special advantage to use catalysts which contain in addition to copper and chromium at least two rare earths, each in an amount of more than 10% w. (calculated as oxides) of the total quantity of rare earths (also calculated as oxides) present in the said catalysts. Thus, for example, catalysts containing more than 10% w. lanthanum oxide and more than 10% w. neodymium oxide or catalysts containing more than 10% w. samarium oxide and more than 10% w. neodymium oxide, or catalysts containing more 10% w. praseodymium oxide and more than 10% w. neodymium oxide are very suitable, all percentages being based on the total amount of rare earths present in the catalysts. Of the above catalysts those containing more than 10% w. neodymium oxide are particularly preferred, whilst those containing more than about 25% w. neodymium oxide are especially preferred.

Salts, hydroxides and oxides of mixtures of rare-earth metals are commercially available under the name of didymium salts, hydroxides and oxides, as for example didymium nitrate. The didymium salts, hydroxides and oxides, although not always of the same compositoin, invariably contain at least three rare-earth metals.

As example the following analyses are of mixtures of rare earths obtained from three commercially available didymium nitrate products after removal of water of hydration and decompositoin of the nitrates by heating (percentages shown are by weight):

The didymium oxide mixture obtained from a commercial didymium nitrate "A" contained approximately 1.5% $Ce_2O_3$, 42.9% $La_2O$, 36.4% $Nd_2O_3$, 2.4% $Gd_2O_3$, 11.2% $Pr_6O_{11}$, 4.9% $Sm_2O_3$ and 0.7% of the non-rare earth $Y_2O_3$.

The didymium oxide mixture obtained from a commercial didymium nitrate "B" contained approximately 3.1% $Ce_2O_3$, 10.4% $La_2O_3$, 10.5% $Gd_2O_3$, 9.7% $Pr_6O_{11}$, 12.4% $Sm_2O_3$, 50.1% $Nd_2O_3$, and 3.8% of the non-rare earth $Y_2O_3$.

The didymium oxide mixture obtained from a commercial didymium nitrate "C" contained approximately 0.1% $Ce_2O_3$, 5.6% $La_2O_3$, 1.5% $Gd_2O_3$, 16.2% $Pr_6O_{11}$, 4.4% $Sm_2O_3$, 71.2% $Nd_2O_3$, and 1.0% of the non-rare earth $Y_2O_3$.

Didymium salts, especially those meeting the rare earth distribution preferences listed above, such as for example the three didymium nitrates listed above, are especially advantageous sources of rare earths. Didymium salts provide the desired rare earths in a usable form at a substantially reduced cost compared to an admixture of purified rare-earth salts.

The catalyst compositions may comprise besides the essential copper, chromium, and rare earths managanese and/or iron. Manganese in divalent form, such as manganese monoxide is generally preferred.

The combined amounts of rare earths, manganese and iron in the catalyst, calculated as oxides, is preferably between about 2 and about 25% by weight based on the weight of unsupported catalyst composition. Amounts between about 3 and about 15% by weight are particularly preferred.

Of the catalyst compositions containing one or more rare earths together with manganese those containing equal amounts, in the range of about 1 to about 7% by weight, of each, calculated as oxides and based on the total unsupported catalyst, are preferred.

Minor amounts of other metals or compounds thereof such as for example alkali-metal compounds and alkaline earth metal compounds, e.g., compounds of lithium, calcium, and/or barium, etc. may be present in the catalyst compositions.

When the catalyst compositions are used in combination with a catalyst support the support may be present in an amount of from about 0 to about 35% by weight. Suitable inert supports comprise for example, alumina, carborundum, silica, pumice etc. In general, it is preferred, to use inert supports having a relatively low surface area. Supports with high surface areas, generally give rise to rapid decline in catalyst activity. Supports having a surface area of less than about 5 m.²/g. are preferred.

The catalysts compositions according to the invention can be prepared in several ways. They can be prepared by impregnating a suitable inert support with an aqueous solution of salts such as for example nitrates of copper, chromium, one or more rare earth metals and optionally manganese and iron, followed by drying. This may be followed by subsequent calcination at a temperature between about 250° C. and about 700° C. Calcination temperatures of from 450° C. to about 550° C. are preferred.

Unsupported catalyst compositons according to the invention can be prepared, for example, by precipitating a mixture comprising hydroxides and/or oxides and/or salts of copper, chromium and one or more rare earths, and optionally manganese and/or iron, from an aqueous solution of salts of these metals, e.g., nitrates, by means of basic substances, such as for example ammonia. The precipitate obtained can be dried and, if desired, subsequently calcined at a temperature between about 250 and 700° C. to obtain the catalyst.

Another method for the preparation of the catalyst comprises impregnation of a mixture of copper oxides and chromium oxides with an aqueous solution which contains thermally decomposable salts such as nitrates, of one or more rare earths and/or manganese and/or iron, or other metals. The resulting material is dried and calcined at about 250° C. to about 500° C.

A very suitable source of admixed copper and chromium oxides is the mixture commercially available under the name "copper chromite." Since the commercial copper chromite often contains about 4% of carbon, it is generally advantageous to heat it at about 500° in air preferably for more than 10 hours, before impregnation with the salt solution.

It is to be understood that the methods described for the preparation of the catalysts are by no means limiting, several other methods being possible for the preparation of catalysts which contain copper, chromium and one or more rare-earth metals and/or manganese and/or iron, and/or oxides of the said metals according to the present invention.

The catalysts of the invention are used for dehydrogenation of hydrocarbons. They may be subjected to activation treatment. An activation treatment conveniently comprises contacting the catalysts in a first step with a mixture containing between about 5 and 50% m. of hydrogen (the remainder comprising one or more inert gases, preferably nitrogen) at a temperature above 150° C., preferably at a temperature of from about 200° to about 300° C., for at least one hour, preferably from between about 4 and about 6 hours. Suitable gas hour space velocities (GHSV) during this step are between 100 and 600 litres gas per litre catalyst per hour, with GHSV's between about 200 and 400 being preferred. The activation treatment is subsequently completed in a second step by contacting the catalyst with a mixture consisting of at least about 90% m. of hydrogen (the remainder comprising one or more inert gases, preferably nitrogen) for at least about 30 minutes, and preferably for between about 1 and about 3 hours. The second step is carried out at a temperature above 150° C., and preferably at a temperature of from about 200° C. to about 300° C. Very suitable GHSV's for the second activation step are between 100 and 600 litres gas per litre catalyst per hour, with velocities between 400 and 600 being preferred.

Hydrocarbons which are dehydrogenated using the catalysts of this invention comprise those of acyclic and alicyclic structure and they may contain aromatic rings in their molecules, e.g., alkylbenzenes, such as for example ethylbenzene.

The invention is very suitable for the dehydrogenation of the paraffinic hydrocarbons; particularly the acyclic paraffins having from 2–20 carbon atoms. Preferred acyclic paraffins comprise those having about 4 or 5 carbon atoms with n-butane and isopentane being especially preferred.

It is of advantage to contact the hydrocarbon to be dehydrogenated with the catalyst in the presence of a diluent gas which is inert with respect to the catalyst and which does not take part in the reaction, and which can aid in furnishing the heat necessary for the reaction. While gases such as nitrogen, argon, and methane are suitable diluents, steam is generally preferred. The amounts of these diluent gases may vary between wide limits, in general the molar ratio of the hydrocarbon to be dehydrogenated to the diluent gas will be between 1:1 and 1:40, preferably between about 1:5 and about 1:25.

It has been found that the presence of molecular hydrogen during the contact of the hydrocarbon to be dehydrogenated with the catalyst has a favorable influence on the dehydrogenation reaction. Cracking of the hydrocarbons is suppressed and the selectivity to dehydrogenated hydrocarbons with the same number of carbon atoms as the hydrocarbon in the feed is increased. Selectivity in this context denotes the molar ratio of dehydrogenated hydrocarbons with the same number of carbon atoms as the hydrocarbon to be dehydrogenated present in the feed, to the total amount of the latter hydrocarbon converted.

In general the addition of hydrogen to the feed limits the dehydrogenation reaction to the removal of one hydrogen molecule per molecule of hydrocarbon. For example, dehydrogenation of isopentane in the presence of hydrogen leads predominantly to isopentene, little or no isoprene being found in the reaction products. Moreover, the gradual decline of the dehydrogenation activity of the catalyst is decreased if the feed contains hydrogen. Molar ratios of the hydrocarbon to be dehydrogenated to hydrogen between 1:1 and 1:40 have proved very suitable. Molar ratios between about 1:5 and about 1:20 are preferred.

In general, temperatures at which dehydrogenation is carried out are between 450 and 600° C. Especially preferred dehydrogenation temperatures are between about 500° C. and about 575° C.

The pressure employed is not very critical. Pressures from about 0.1 kg./cm.$^2$ up to 100 kg./cm.$^2$ can very suitably be used. In most cases it is preferred to carry out the dehydrogenation reaction at or near atmospheric pressure.

The reaction can be carried out batchwise, semi-continuously or continuously. The catalyst can be employed as a fixed bed or in a fluidized state. The amount of hydrocarbon to be dehydrogenated which is to be contacted with the catalyst per unit time may vary between wide limits. Space velocities of between about 0.01 and about 10 litres of liquid hydrocarbon charge per litre of catalyst per hour are suitable; space velocities of from 0.02 being preferred.

The catalyst gradually loses activity during the dehydrogenation reaction, which makes periodic regeneration desirable if not necessary. The decline in dehydrogenating activity, expressed as decrease of percentage of hydrocarbon feed converted per hour, may vary considerably. This decline depends in part on composition of catalyst and composition of feed, i.e., the presence or absence therein or therefrom of hydrogen and steam. For example, a catalyst containing 5% w. of didymium oxide and a mixture of copper- and chromium-oxides (containing 35% w. of copper and 38% w. of chromium) loses 1.1% of its dehydrogenation activity (as defined above) per hour if the feed consists of a mixture of 1 mole isopentane and 20 mole of steam, and only 0.52% per hour if the feed consists of a mixture of 1 mole isopentane, 10 mole of hydrogen and 10 mole of steam under the same conditions (temperature 550° C., LHSV 0.253 litre liquid isopentane per litre catalyst per hour).

The regeneration of the catalyst can conveniently be carried out by contacting the catalyst with steam, preferably with a mixture of hydrogen and steam. Hydrogen and steam in the molar ratio wherein these components are present together with the hydrocarbon during the dehydrogenation reaction, at a temperature above about 40° C., preferably between 50° and 600° C. are especially preferred. GHSV's between 1500 and 2000 are very suitable. A suitable regeneration time is generally between 0.5 and 2 hours.

For example, regeneration of the catalyst is easily obtained in cases where a mixture of hydrocarbon, hydrogen and steam is contacted with the catalyst by interruption of the hydrocarbon steam to the catalyst while maintaining the hydrogen and steam streams.

If desired an activation treatment of the catalyst as describer above for a fresh catalyst can be carried out following the regeneration.

In order to obtain catalysts with a very high activity for the dehydrogenation of hydrocarbons, a special method of regeneration, which is somewhat more time-consuming than the regeneration method described above, is preferred. In this case regeneration is accomplished by contacting the catalyst in a first step for at least one hour, preferably between 3 and 6 hours, with a mixture of steam and air having a volume ratio between 30:70 and 70:30, preferably between 40:60 and 60:40, at a temperature between 400° and 700° C., preferably between 450° and 550° C. Very suitable GHSV's are between 100 and 1000 litres gas per litre catalyst per hour, with GHSV's between 500 and 700 being preferred. The regeneration is subsequently brought to an end in a second step by contacting the catalyst with a mixture consisting entirely or substantially of air for a period of at least 5 hours, preferably between about 15 and 25 hours, at a temperature between 400 and 700° C., preferably between 450° and 550° C. Very eligible GHSV's for this second step are between 100 and 1000, in particular between 150 and 400.

Subsequent to this regeneration an activation treatment as described above for a fresh catalyst is generally preferred.

Although the catalysts regenerated according to the more time-consuming regeneration procedure show very high conversions of the hydrocarbons to be dehydrogenated, the selectivity (as defined above) may be somewhat lower than can be obtained with catalysts regenerated according to the less time-consuming regeneration method described hereinbefore.

From the reaction mixture obtained, the dehydrogenated products can be isolated according to known techniques, such as for example by distillation. Monoolefins obtained as reaction products can be further dehydrogenated to diolefins by means of any suitable means, for example catalytically with catalysts according to the invention or with other catalysts, for example catalysts comprising iron, chromium and potassium, or catalysts comprising chromium- and aluminum-oxide.

EXAMPLES—GENERAL

For the preparation of the catalysts used in the following examples a commercial 16–30 mesh copper chromite (calcined for 2 hours at 500° C.) was used, which contained about 35% w. of copper, about 38% w. of chromium, 0.66% w. of zinc and less than 0.25% w. of each of the elements aluminum, silicon, iron, cobalt, nickel, silver, magnesium, calcium and barium (altogether less than 0.75% w.), the remainder comprising oxygen and about 1% carbon.

The catalysts were prepared by impregnation of the copper chromite with an aqueous solution of didymium nitrate and/or manganous nitrate. The amount of water used in this solution was equal to the pore volume of the copper chromite impregnated (0.2 ml./g.), and the amounts of didymium nitrate and manganese nitrate used were sufficient to obtain the desired amount of didymium oxide and manganous oxide in the catalysts after removal of water and decomposition of the nitrates. After impregnation, water was removed and the nitrates were decomposed by heating the impregnated copper chromites for 30 minutes on a steam bath for two hours at 120° C. and for two hours at 500° C. in air.

The didymium nitrate used for the preparation of the catalysts was in all cases commercial didymium nitrate B, which upon thermal decomposition yielded the following approximate percentages of rare-earth oxides:

| | Percent |
|---|---|
| $Ce_2O_3$ | 3.1 |
| $La_2O_3$ | 10.4 |
| $Gd_2O_3$ | 10.5 |
| $Pr_6O_{11}$ | 9.7 |
| $Sm_2O_3$ | 12.4 |
| $Nd_2O_3$ | 50.1 |
| $Ye_2O_3$ (Non-rare earth) | 3.8 |

Example I

A reactor with a diameter of 27 mm. was filled to a height of 16 cm. with a catalyst comprising 5% w. didymium oxide on copper chromite. A mixture of steam and hydrogen (1:1 v./v.) was led over the catalyst bed, while the temperature of the latter was increased from room temperature to 550° C. in one hour. Subsequently, in experiment 1 a mixture of isopentane and steam (molar ratio 1:20) was passed over the catalyst at a temperature of 550° at atmospheric pressure at a space velocity of 0.253 litre liquid isopentane per litre catalyst per hour. In experiment 2 a mixture of isopentane, steam and hydrogen (molar ratio 1:10:10) was passed at the same space velocity and the same temperature and pressure as described in experiment 1 over a fresh identical bed of catalyst which had been heated in a steam-hydrogen stream to 550° C. as described above. In experiment 2 the catalyst was regenerated after 24 hours with a mixture of steam and hydrogen (molar ratio 1:1, obtained by interrupting the isopentane stream), for one hour, at a gas hourly space velocity of 1900 litres gas per litre catalyst per hour at 550° C. The conversions of isopentane and the selectivities (expressed as percentage of the total amount of isopentane converted to unsaturated hydrocarbons with five carbon atoms) found in experiments 1 and 2 at several times are presented in Table I.

TABLE I

| | Experiment 1 | | Experiment 2 | |
|---|---|---|---|---|
| | Conversion, percent | Selectivity, percent | Conversion, percent | Selectivity, percent |
| Run hours: | | | | |
| 1 | 23.5 | 49 | 19.0 | 80 |
| 5 | 18.6 | 34 | 17.2 | 81 |
| 10 | 13.6 | 8 | 13.4 | 81 |
| 20 | | | 11.6 | 88 |
| 24 | | | 10.1 | 83 |
| 24-25 [1] | | | | |
| 26 | | | 10.2 | 84 |
| 30 | | | 10.2 | 80 |

[1] Regeneration in experiment 2.

Table I shows that addition of hydrogen to the feed strongly retards the activity decline of the catalyst, and increases the selectivity.

In Experiment 1 the unsaturated compounds with five carbon atoms consisted of isoprene and isopentene, in Experiment 2 only isopentene was found.

Example II

Several catalysts containing varying amounts of didymium oxide and manganese oxide were prepared as described under "General" and tested.

The apparatus and steam and hydrogen catalyst pretreatment of Example 1 were used. A mixture of isopentane, steam and hydrogen (molar ratio 1:10:10) was passed over the catalyst at a temperature of 550° C. at atmospheric pressure at a space velocity of 0.253 litre liquid isopentane per litre catalyst per hour. Table II shows the conversions of isopentane and selectivities to isopentene after one and six run hours, and the activity decline of the catalyst, expressed as percentage of conversion decrease per hour.

TABLE II

| Catalyst composition | After 1 run hour | | After 6 run hours | | Activity decline of catalyst, percent/hr. |
|---|---|---|---|---|---|
| | Conversion, percent | Selectivity, percent | Conversion, percent | Selectivity, percent | |
| Basis: Copper chromite, addition: | | | | | |
| 2.5% Di$_2$O$_3$ | 14.3 | 76 | 2.0 | 80 | 2.46 |
| 5% Di$_2$O$_3$ | 19.0 | 80 | 16.4 | 82 | 0.52 |
| 5% MnO | 17.6 | 83 | 17.5 | 83 | 0.02 |
| 1% MnO plus 2.5% Di$_2$O$_3$ | 21.9 | 65 | 12.5 | 76 | 1.88 |
| 2.5% MnO plus 2.5% Di$_2$O$_3$ | 25.2 | 66 | 21.5 | 69 | 0.74 |
| 5% MnO plus 2.5% Di$_2$O$_3$ | 21.7 | 73 | 17.6 | 71 | 0.82 |
| 7.5% MnO plus 2.5% Di$_2$O$_3$ | 20.4 | 78 | 15.9 | 73 | 0.90 |

Example III

A reactor with a diameter of 27 mm. was filled to a height of 16 cm. with a catalyst consisting of 5% w. didymium oxide on copper chromite, which had been prepared as described under "General."

The catalyst was activated by passing a mixture of hydrogen and nitrogen (molar ratio 10:90) at a temperature of 250° C. and a gas hourly space velocity of 330 litres gas per litre catalyst per hour over the catalyst for 5 hours, and subsequently passing pure hydrogen at the same temperature and the same space velocity over the catalyst for 2 hours. Then the catalyst was heated to 550° C. while a mixture of steam and hydrogen (1:1 v./v.) was passed over it at a space velocity of 660 litres gas per litre catalyst per hour.

A mixture of isopentane, steam and hydrogen (molar ratio 1:10:10) was passed over the catalyst at 550° C., at atmospheric pressure and a space velocity of 0.252 litre liquid isopentane per litre catalyst per hour.

After 16 run hours the catalyst was regenerated by pasing over it a mixture of steam and air (volume ratio 1:1 at 500° C. for 5 hours at a space velocity of 660 litres gas per iltre catalyst per hour, and subsequently passing air over the catalyst at 500° C. at a space velocity of 330 litres air per litre catalyst per hour for 20 hours. The catalyst was actiavted as described above, and subsequently the same mixture as used before the regeneration step was carried out was passed over the catalyst under identical conditions. Table III shows the conversion of isopentane and the selectivity to isopentene.

TABLE III

| | Before regeneration | | After regeneration | |
|---|---|---|---|---|
| | Conversion, percent | Selectivity, percent | Conversion, percent | Selectivity, percent |
| Run hours: | | | | |
| 1 | 52 | 48 | 35 | 77 |
| 4 | 46 | 54 | 29 | 77 |
| 8 | 38 | 62 | 24 | 77 |
| 16 | 28 | 72 | 18 | 76 |
| 24 | 10 | 73 | 17 | 76 |

A comparison of Table III and Table I shows that the special activation treatment of the catalyst, as carried out in Example III leads to a high initial conversion of the isopentane, the selectivity to isopentene being somewhat lower.

As can be seen in Table III, after regeneration of the catalyst with the special method described a conversion level of about 20% can be maintained for longer periods with a selectivity of about 75%.

As a comparison it can be seen from Table I, Experiment 2 that after regeneration with steam and hydrogen for one hour a conversion of about 10% is reached, the selectivity to isobutane in the latter case, however, being somewhat higher (about 80%).

We claim as our invention:

1. A catalyst composition consisting essentially of from 0 to about 35% w. of an inert support and from about 65 to about 100% w. of an active material, which active material comprises from about 30 to 60% w. copper oxide from about 35 to 65% w. chromium oxide and from about 1 to about 15% w. of rare earths.

2. The catalyst composition of claim 1 wherein said rare earths consist of at least two rare earths each in an amount of more than 10% w. of the total quantity of rare earths present in the catalyst.

3. The catalyst composition of calim 2 wherein the active material contains additionally from about 1% to about 10% w. of manganese oxide.

4. The catalyst composition of claim 3 wherein copper oxide and chromium oxide are present in a molar ratio of about 1 to 1.

5. The catalyst composition of claim 4 wherein neodymium oxide is present in an amount of more than 10% w. of the total quantity of rare earths present in the catalyst.

6. A process for the dehydrogenation of hydrocarbons which consists essentially of contacting the hydrocarbon in the vapor phase under dehydrogenation conditions, including a temperature of from about 450 to about 600° C. and a pressure of from about 0.1 to about 100 kg./cm.$^2$, with the catalyst composition of claim 1.

7. The process of claim 6 wherein the hydrocarbon is saturated, acyclic hydrocarbon of from about 2 to 20 carbon atoms.

8. The process of claim 7 wherein the hydrocarbon is contacted with the catalyst in the presence of added molecular hydrogen.

9. The process according to claim 8 wherein the hydrocarbon is contacted with the catalyst in the presence of added hydrogen and an inert diluent gas in a molar ratio of hydrocarbon to inert diluent gas to hydrogen from about 1:1:1 to about 1:40:40.

10. The process according to claim 9 wherein the catalyst composition consists essentially of from 0 to about 35% w. of an inert support and from about 65 to about 100% w. of an active material, which active material consists essentially of about 30 to 60% w. copper oxide, about 35 to 65% w. chromium oxide and from about 10 to about 15% neodymium oxide employed and the hydrocarbon is selected from the group consisting of n-butane and isopentane.

References Cited

UNITED STATES PATENTS

| | | | |
|---|---|---|---|
| 2,246,682 | 6/1941 | Heard et al. | 260—683.3 |
| 2,280,060 | 4/1942 | Burk et al. | 260—683.3 |
| 2,377,113 | 5/1945 | Thomas | 260—683.3 |
| 2,820,434 | 1/1958 | Komarewsky | 260—683.3 |
| 3,148,228 | 8/1964 | Franz et al. | 260—683.3 |

DELBERT E. GANTZ, Primary Examiner

G. E. SCHMITKONS, Assistant Examiner

U.S. Cl. X.R.

252—462; 260—680